June 2, 1970 G. STEIN 3,515,441
POWER CONTROL DEVICE
Original Filed Aug. 23, 1968
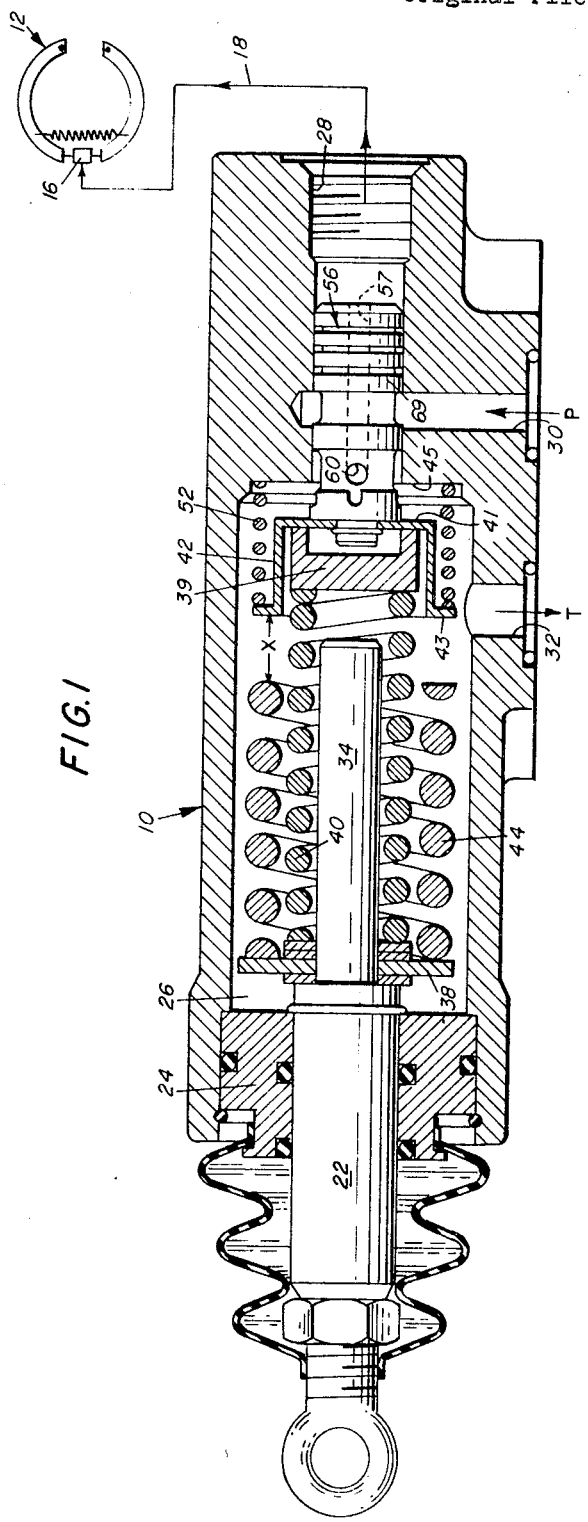
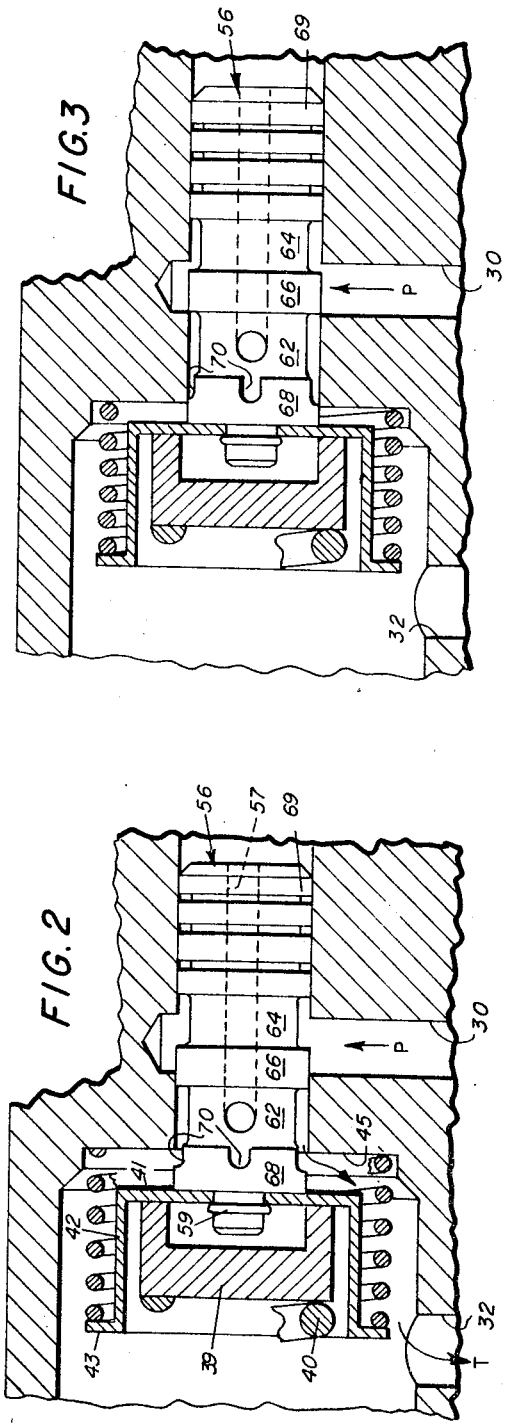
INVENTOR
GARY STEIN
BY Robillard and Byrne
ATTORNEYS

United States Patent Office 3,515,441
Patented June 2, 1970

3,515,441
POWER CONTROL DEVICE

Gary Stein, Brookfield, Wis., assignor to Applied Power Industries, Inc., Milwaukee, Wis., a corporation of Wisconsin
Continuation of application Ser. No. 754,915, Aug. 23, 1968. This application Sept. 22, 1969, Ser. No. 860,179
Int. Cl. B60t 15/12, 17/04
U.S. Cl. 303—54      4 Claims

ABSTRACT OF THE DISCLOSURE

A valve particularly suitable for use as a control for a hydraulic braking mechanism, having excellent control at initial pressure ranges, wherein a series of sequentially engageable back-pressure springs working in combination with a feed-back pressure and a controlled bleeding arrangement transmits a "braking feel" to an operator and wherein a double metering arrangement provides an antihunt characteristic.

---

This application is a continuation application of Ser. No. 754,915, filed Aug. 23, 1968 now abandoned, entitled Power Control Device.

This invention relates particularly to a hydraulic control valve and more particularly to control valve which has the capacity to transmit a hydraulic pressure to a braking mechanism while transmitting a progressively increasing braking "feel" to the operator as he actuates a brake pedal or like device.

A principal objective of this invention is to provide a control valve wherein an increasing resistance to movement is provided as a braking pedal is depressed.

A further objective of this invention is to provide a metering capability within a valve wherein any reciprocating tendency normally found in balanced valves of the type described, is reduced.

Another important objective of this invention is to provide a braking valve having uniformity of operation and a ruggedness of performance heretofore not attained in the art.

A still further objective of this invention is to provide a braking valve which is simple in design, has an ease of repair and has a tendency for long life due to its facility to exhaust hydraulic fluid impurities to its fluid reservoir.

Another important objective of the invention is to reduce the necessary tolerances normally required for valves of the type described but at the same time improving valve performance.

These and other objects of the invention will become more apparent to those skilled in the art by reference to the following detailed description when viewed in light of the accompanying drawings, wherein:

FIG. 1 is a partially diagrammatic view including a longitudinal cross-section of the valve;

FIG. 2 is an enlargement of a portion of FIG. 1 showing one position of the spool; and FIG. 3 is a view similar to FIG. 2 showing a second position of the same spool.

Referring now to the drawings wherein like elements are referred to by like numerals, the numeral 10 indicates the valve housing of this invention. In the embodiment described, the valve is utilized to activate a braking mechanism 12. Actual operation of the brake is accomplished by the expansion action of a cylinder 16. The expansion chamber of the cylinder is communicated to the output line of the housing 10 by a conduit 18.

An operator activated rod 22, normally connected to a brake pedal or the like, is slidably received into one end of the housing through a sealing member 24. The chamber of housing 10 is indicated by the numeral 26. The chamber is closed at its first end by the sealing member 24 and at its other end, the chamber 26 leads to a bore 28.

A source of pressure P is communicated to bore 28 by an inlet passageway 30. A tank return passageway 32 communicates the chamber 26 to the fluid reservoir T. The rod 22 is reduced at its inner end to form a stem portion 34 which extends throughout a substantial part of the length of chamber 26. An abutment ring 38 is fixedly secured to rod 22 at the inner end of the stem.

Disposed about the stem 34 is a first spring 40 extending between the abutment 38 and a spacer element 39. The spacer element 39 is supported on the base 41 of a hat-shaped, spring retainer 42. A second spring 44, circumscribing the first spring is disposed between a rim 43 of the spring retainer 42 and the ring 38. As shown in FIG. 1, the end of spring 44 is normally spaced a distance X from rim 43. A ledge 45 is formed between the chamber 26 and bore 28. The spring retainer 42 is biased away from the ledge by a third spring 52. Note that ledge 45 is disposed between the power fluid inlet passageway 30 and the tank return passageway 32.

A spool 56, having a longitudinal bore 57 is slidably received in bore 28 and is connected to the base of the spring retainer 42 by a snap ring 59.

A transverse bore 60 communicates the passageway 57 to a first annular groove 62 formed in the spool. The spool 56 is also formed with a second annular pressure balance groove 64. The grooves 62 and 64 are separated by a land 66. The spool is also formed with a second annular pressure balance groove 64. The grooves 62 and 64 are separated by a land 66. The spool is also formed with an inner land 68 and an outer land 69.

The land 68 is fluted at 70. The flutes terminate intermediate the length of the land and open to annular groove 62. It is important here to note that the distance between the ends of flutes 70 and the land 66 is substantially equal to the distance between the surface of passageway 30 and ledge 45.

When an operator wishes to brake, the stem member 22 is moved to the right as viewed in FIG. 1. The first amount of movement is transmitted to spool 56 through the spring 40.

As the spool moves to the right, the fluid trapped in line 18 will begin a braking action substantially independent of any of the booster pressure from source P. As the spool is moved further to the right, for instance to the position of FIG. 2, leakage increases between land 66 and passageway 30. Some of this leakage fluid acts as booster power. The full amount of booster pressure is not applied, however, because the flutes 70 are metering some of the fluid to tank. For a certain movement of the brake pedal, the spool will tend to seek this position, i.e., the position where the back pressure on the spool will tend to balance the counter force transmitted through the spring system.

When there is full pedal depression (FIG. 3) the flutes no longer meter to tank and the full booster pressure is transmitted to the brake system. The back pressure will tend to move the spool to the metering position. After movement of the rod member 22 inwardly, the spool will maintain a balanced position because of the feedback pressure. The feedback pressure is exerted against the outer surface 70 of spool 56.

The above-mentioned flutes are an important aspect of this invention. With the flute arrangement, the spool meters at two points; namely at the ends of the flutes and ledge 45 between the passageway 30 and land 66. This gives a very smooth and accurate response and reduces the "hunting" tendencies.

Note that the spring pressure increases as rod 22 is moved further to the right. When the rod covers the distance X, the second pressure spring 44 makes contact with the rim 44 of the hat-shaped member and the spool moves to the right against the bias of both springs. For each movement in rod 22 a particular pressure builds along the feed back surface to give the desired braking "feel" to the operator. As member 22 is moved further to the right, the third back pressure spring 52 is effective. At this point, the braking "feel" is the sum of three springs taken with the back pressure.

As can be seen, there has been described a valve which increases brake feel as a pedal is depressed. Crucial tolerances are overcome by taking advantage of the bleeding or leakage characteristic in the spool.

In a general manner, while there has been disclosed an effective embodiment of the invention, it should be well understood that the invention is not limited to such embodiment, as there might be changes made in the arrangement, disposition, and form of the parts without departing from the principle of the present invention.

I claim:
1. A master unit for supplying booster power to a conduit leading to a power operated component comprising in combination:
  a housing defining a chamber having a spool bore extending between said conduit and said chamber,
  a power bore communicating a source of pressurized fluid to said spool bore,
  a reservoir bore communicating said chamber to fluid reservoir,
  an operator rod extending into said chamber,
  a ledge surface formed where said bore communicates with said chamber,
  a spool slidably received in said bore and having an inner end within said chamber and an outer surface facing said conduit,
  bias means connecting said rod and said spool,
  said spool having first and second lands forming a groove therebetween,
  said first land having at least one flute means formed in its periphery having an open end in communication with said groove and a closed end intermediate the longitudinal length of said first land,
  passageway means communicating fluid pressure in said groove to said conduit,
  said spool having a normal position wherein said first land is within said chamber and said second land isolates said power bore from said chamber, a power position wherein said first land is within said bore a sufficient amount to isolate said power bore from said chamber and wherein said groove is communicated with said power bore and a metering position wherein said flute means of said first land is disposed over said ledge.

2. The unit of claim 1 wherein said bias means comprises a plurality of springs which are sequentially effective as said rod is moved toward said spool.

3. The unit of claim 1 wherein said second land meters progressively greater amounts of power fluid to said groove and said flute means meters progressively lesser amounts of fluid to said chamber as said spool is moved from said metering position to said power position.

4. The unit of claim 2 wherein a back pressure develops along said outer surface of said spool in opposition to said bias means when booster pressure is communicated to said conduit.

References Cited

UNITED STATES PATENTS

| | | | |
|---|---|---|---|
| 3,317,252 | 5/1967 | Glassman | 303—54 |
| 3,423,136 | 1/1969 | Lohbauer | 137—625.67 |
| 3,431,030 | 3/1969 | Boveil et al. | 303—10 X |

FOREIGN PATENTS 515,440  12/1939  Great Britain.

DUANE A. REGER, Primary Examiner

J. J. McLAUGHLIN, Jr., Assistant Examiner

U.S. Cl. X.R.

60—52; 137—625.68; 188—152; 303—10, 87